Sept. 22, 1931.  M. E. MILLER  1,824,359
PACKING MEANS FOR FOOD MATERIALS
Filed May 26, 1927  7 Sheets-Sheet 1

INVENTOR.
Morris E. Miller
BY Geo A Pitts
ATTORNEYS.

Sept. 22, 1931.  M. E. MILLER  1,824,359
PACKING MEANS FOR FOOD MATERIALS
Filed May 26, 1927  7 Sheets-Sheet 2

INVENTOR.
Morris E. Miller
BY
ATTORNEYS.

Sept. 22, 1931.                M. E. MILLER                 1,824,359
                    PACKING MEANS FOR FOOD MATERIALS
                    Filed May 26, 1927          7 Sheets-Sheet 3

INVENTOR.
Morris E. Miller
BY
ATTORNEYS.

Sept. 22, 1931.  M. E. MILLER  1,824,359

PACKING MEANS FOR FOOD MATERIALS

Filed May 26, 1927   7 Sheets-Sheet 6

INVENTOR.
Morris E. Miller
BY Geo A Pitts
ATTORNEYS.

Sept. 22, 1931. M. E. MILLER 1,824,359
PACKING MEANS FOR FOOD MATERIALS
Filed May 26, 1927 7 Sheets-Sheet 7

INVENTOR.
Morris E. Miller
BY
ATTORNEYS.

Patented Sept. 22, 1931

1,824,359

UNITED STATES PATENT OFFICE

MORRIS E. MILLER, OF CANTON, OHIO, ASSIGNOR TO THE H. H. MILLER INDUSTRIES COMPANY, OF CANTON, OHIO, A CORPORATION OF OHIO

PACKING MEANS FOR FOOD MATERIALS

Application filed May 26, 1927. Serial No. 194,336.

This invention relates to the process of freezing and packing materials, such as ice cream and the like and packing means therefor.

In the present practice of handling and shipping frozen materials it is customary to fill cans therewith and to place the filled cans in refrigerated storing rooms to harden the material. When these cans are to be delivered to customers they are then placed in heavy tubs and packed with cracked ice and salt or the cans are placed in specially constructed jackets formed of non-heat conducting materials. In both of these methods, the empty can and the jackets have to be returned to the shipper and in the first method great inconvenience and damage to the tubs and cans result from the remaining liquid and salt.

One object of the invention is to provide an improved process wherein all of these objections are overcome in that the container and packing means are relatively light and economical, such container and means do not have to be returned to the shipper and the cooling means is of a character that eliminates a resulting product or residue in the form of liquid or other material.

Another object of the invention is to provide an improved process of packing frozen materials, whereby the packing, storing, handling and shipment of such materials is greatly facilitated and cheapened.

Another object of the invention is to provide an improved storing container for frozen materials, whereby the cost of the equipment is materially reduced and the frozen materials when hardened can be readily handled.

Another object of the invention is to provide an improved process of freezing food material wherein the material is successively subjected to refrigerants of progressively lower temperatures facilitating the storing or shipment of the material and insuring great economy.

Another object of the invention is to provide an improved packing means for frozen materials, whereby its packing for shipment to distant points and handling is facilitated and cost thereof is greatly reduced.

Other objects of the invention will be apparent to those skilled in the art to which my invention relates from the following description taken in connection with the accompanying drawings, wherein.

In the drawings, 1 indicates as an entirety a container. The container may be of any desired size. It may be of standard size, capable of holding either five or ten gallons of frozen material A. It comprises an outer member 2 and an inner member 3 removably fitting the outer member, both being by preference cylindrical in shape, and a cover 4; also a locking means 5 where the outer member 2 (as in the embodiments herein illustrated) comprise relatively movable sections. The inner member 3 is in the form of a holder (substantially a bag) closed at its lower end and open at its upper end, and such member is formed of flexible material, for example, a suitable quality of paper stock, coated on its inner surface with paraffin or equivalent material and by preference similarly coated on its outer surface. By making these inner members of flexible material, large quantities thereof can be stored for use in a small space or packed for ready shipment; by using paper, great economy results, reduction in weight is effected and destruction of the container member when emptied involves minimum waste. By paraffining the inner surface of the inner member 3, absorption of the frozen material by the paper is avoided; and by paraffining its outer surface danger of the member adhering to the walls of the outer member is lessened. In the use of a flexible member, such as herein shown, the outer member serves to (a) support the inner member while being filled, (b) prevent the expansion of its sides while the material A is in a semi-liquid state, and (c) give predetermined shape to the material when hardened, whereby it may be adapted to predetermined sized packing means and placed in suitable dispensing cans by the dispenser.

Figures 1, 2, 3, 3A, 3B:
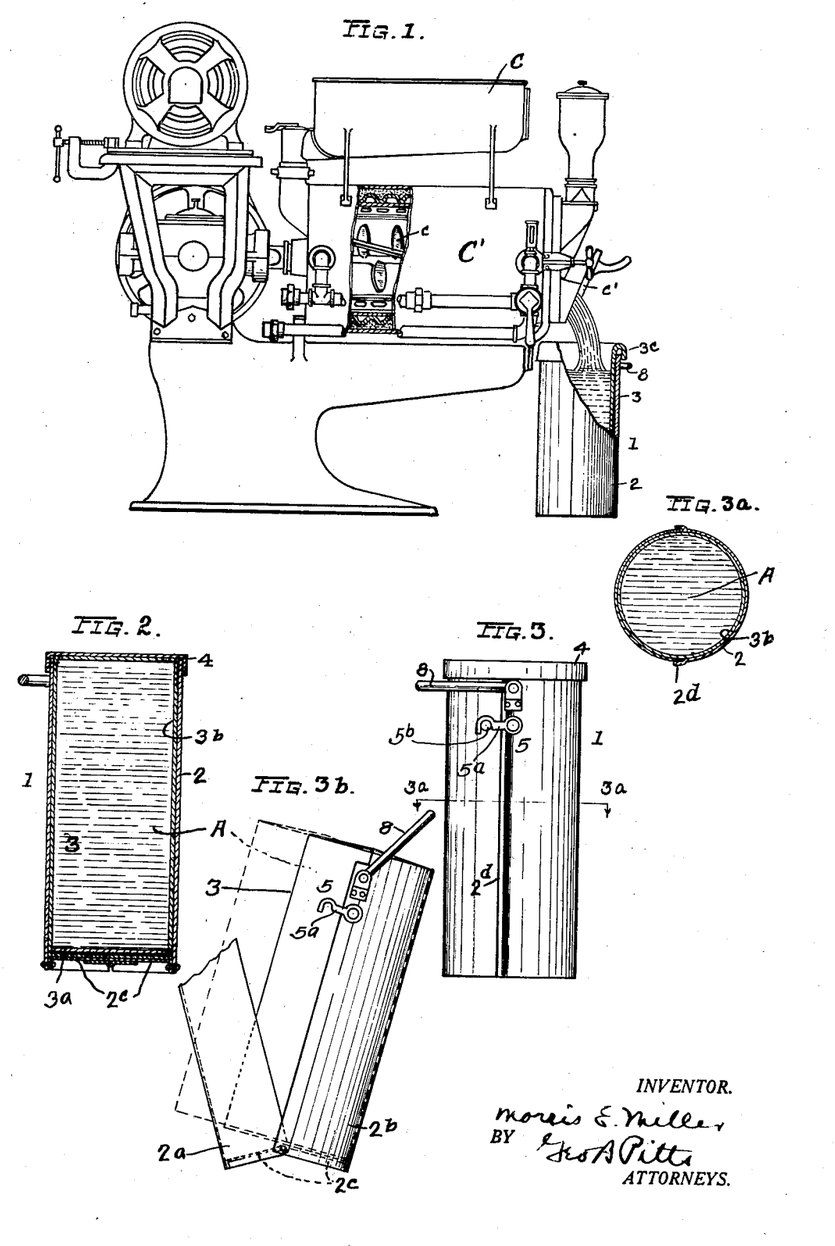
Fig. 1 is a side elevation of a freezing machine (partly in section) and a container embodying my invention; this view illustrating the step of filling the container.
Fig. 2 is a vertical section of the container filled with frozen material.
Fig. 3 is a side elevation of a filled container.
Fig. 3a is a section on the line 3a—3a of Fig. 3.
Fig. 3b is a side elevation of a container, but with the elements of the outer member of the container in separated relation to permit removal of the inner member enclosing the hardened batch of frozen material.
Figures 5, 6, 7, 8, 8A, 11, 12:
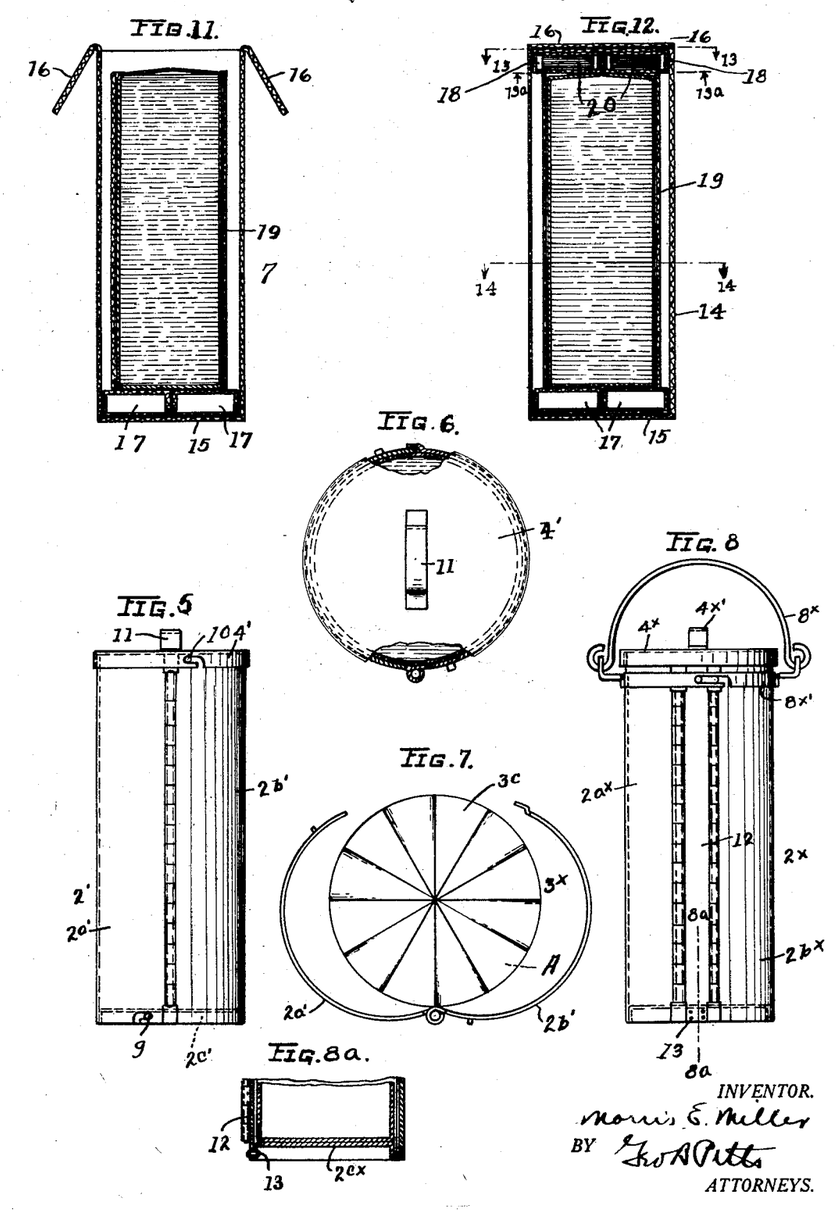
Fig. 5 is an elevation of container embodying my invention but of slightly different form.
Fig. 6 is a plan view of the parts shown in Fig. 5, partly in section.
Fig. 7 is a plan view of the embodiment shown in Figs. 5 and 6, but with the elements of the outer member in separated relation.
Figs. 8, 9 and 10 are views similar to Figs. 5, 6 and 7, respectively, but showing a container embodying my invention of a form different therefrom.
Fig. 8a is a section on the line 8a—8a of Fig. 8.
Fig. 11 is a vertical section of a packing means and the inner member with a batch of frozen material therein, showing the latter partially packed.
Fig. 12 is a view similar to Fig. 11, but showing the batch completely packed for shipment.
Figure 10:
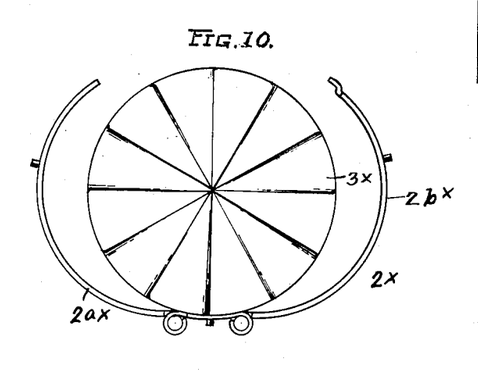

The inner member 3 comprises a bottom 3a and sides 3b and, when expanded or opened, it is of the same shape and of approximately the same size in cross section as the outer member 2 and fits within the latter, as shown in Fig. 1, whereby the inner member 3 may be slid endwise through the open end of the outer member 2. The inner member 3 is somewhat longer, as shown at 3c, than the outer member 2, these extended portions being adapted to be folded down on the top of the batch of material A to form a top wall 6 therefor. As will be understood, the extended portions 3a may be folded in substantially radial lines as best shown in Figs. 7 and 10. The material to be frozen and packed for storage or shipment may be of any desired kind, for example, flavored cream for the making of ice cream. This material is delivered at a temperature approximating 40 degrees F. to a tank C, wherein it is measured and then discharged into the refrigerated cylinder of a freezing machine C' having a suitable agitating and scraping mechanism c. In treating the material in the machine C, its temperature is uniformly lowered to approximately 25 degrees F., whereupon a valve c' is opened to allow the material to flow into the inner member or holder 3. For this latter purpose, the inner member 3 is placed within and expanded into engagement with the bottom and sides of the outer member with its extended portions flared outwardly and turned back on itself to form a full open end or such portions may be engaged by a suitable expansion tool (not shown) to hold them open while the member 3 is being filled; then the container 1 is positioned below the discharge valve c' of a freezing machine C' and filled (as shown in Fig. 1). The container is then closed by folding over the extended portions 3c on the batch A and positioning the cover 4 on the member 2, as shown in Figs. 2 and 3. Next, the filled container is stored for hardening purposes, either in a refrigerated room or in a brine tank or in body of cracked ice and salt, whereby the temperature of the material is lowered to approximately zero and hardened into a condition permitting it to be handled independently of any rigid support, if desired.

Figure 4:
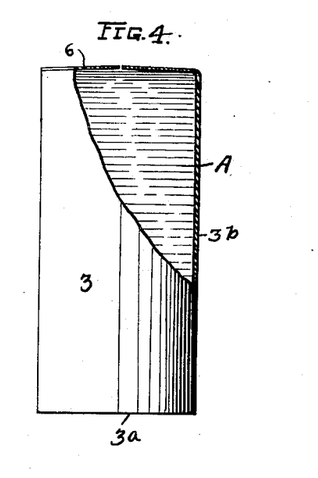
Fig. 4 is an elevation of a frozen batch enclosed within the container inner member, when removed from the outer member, partly broken away.

While being hardened, the batch A takes the shape of the outer member 2, as already set forth, and hence becomes a substantially solid column or body wrapped in paraffin paper (see Fig. 4) and capable of being handled or transferred from its holding member 2 to a packing means 7 and from the latter to the usual dispensing cabinet, preferably a can therein. When the batch A is to be delivered to a customer, the container 1 is removed from its place of storage and the wrapped body A is removed from the outer member 2. This step may be accomplished by endwise movement of the wrapped body A outwardly of the member 2, but due to the fact that the batch when hardened expands and would therefore be compressed against the inner surface of the member 2, I prefer to construct the latter of sections any one or more of which may be moved laterally away from the inner member 3, so that the wrapped body A can be readily disengaged or separated from the member 2 and picked up and bodily transferred to the packing means 7, which will later be described.

Th outer container member 2 of the form shown in Figs. 2, 3, 3a and 3b consists of two semi-cylindrical sections 2a, 2b, each having a bottom 2c. The abutting edges of the bottoms 2c are hinged together, whereby either section can be swung relative to the other section, as shown in Fig. 3b, or both may be operated to effect their separation. By preference, one section (3b) is provided along its longitudinal side edges with off-set flanges 2d to overlap the side edges of the other section to close the joint between the sections. The locking means 5, which may be provided to hold the sections 2a, 2b, together, comprises a pivoted hook 5a on one or each side of one section and a lug 5b on the other section removably engaged by the hook, as shown in Fig. 3.

8 indicates a bail pivoted on opposite sides of the section 2b and enabling the container to be readily carried. The cover 4 frictionally fits the upper ends of the sections 2a, 2b, but if desired suitable locking means may be provided for removably holding it in place.

In Figs. 5, 6 and 7, which show another form of outer member, the sections 2a', 2b', of the container member 2' are hinged at one side along adjacent longitudinal side edges and the bottom 2c' for the member comprises a flanged disk disposed within the side walls of the sections and having a bayonet joint connection, as shown at 9, with these walls; also the cover 4' has by preference a bayonet joint connection with the sections 2a', 2b', as shown at 10. 11 indicates a suitable handle for carrying the container. When the hardened batch A is to be removed from the member 2', the bottom 2c' and cover 4' are removed and the sections 2a', 2b', are swung laterally away from each other, as shown in Fig. 7.

Figure 9:
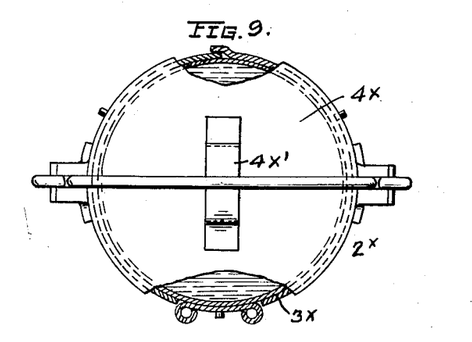

Figs. 8, 9 and 10 show a container 2x having the sections 2a<sup>x</sup>, 2b<sup>x</sup>, which are hinged along their longitudinal sides to an intermediate side wall section 12 and the bottom 2c<sup>x</sup> is rigidly connected, as by rivets 13, to the lower end of the section 12. 4x indicates the cover frictionally or otherwise removably mounted on the sections 2a<sup>x</sup>, 2b<sup>x</sup>, as shown in Figs. 8 and 9, and having a suitable handle 4x'. 8x indicates a bail pivotally connected to a ring 8x', which may have a bayonet joint connection with the sections 2a<sup>x</sup>, 2b<sup>x</sup>, and 12. When it is desired to remove the hardened batch A and inner member 3x from the member 2x, the cover 4x and ring 8x' are removed and then the sections 2a<sup>x</sup>, 2b<sup>x</sup>, are swung laterally about their respective hinges, as shown in Fig. 10.

In the next step of my process the wrapped body of hardened material is placed in a packing means 7 surrounded with communicating chambers or cells certain of which contain a suitable refrigerant of relatively lower temperature than that used for hardening the material, whereby the wrapped body A is insulated from the temperature of the atmosphere, refrigerated, protected against damage and supported for handling and shipment.

The packing means 7 comprises a casing having inner and outer walls disposed in spaced relation, end walls and compartments adjacent the inner faces of the end walls, certain or all of which compartments hold a suitable refrigerant, whereby the air in the spaces between the walls of the casing is lowered in temperature, the refrigerant in the compartments serving to maintain the end portions of the body in frozen condition and the refrigerated space between the compartments serving to maintain the central portion of the body in frozen condition. As shown in Figs. 13, 13a, 14, 15 and 16, the inner walls of the compartments are formed with openings 11 to permit circulation of air and the gas, which results from the vaporization of the refrigerant, into the spaces between the casing side walls.

The several walls of the packing means 7 are preferably formed from cellulose stock material, whereby the advantages of compactness, lightness, cheapness and ready fabrication are obtained and also a substantially air tight enclosure produced. I have found card board formed from corrugated stock and surfaced with thin sheet paper material is admirably suited for my purpose and having all of the advantages above referred to. Figs. 11, 12, 13, 13a, 14 and 15 show one form of packing means formed from cellulose material. In these views, 14 indicates the outer side walls and 15 indicates the bottom. 16 indicates the top comprising one or more flaps capable of being folded from the position shown in Fig. 11 to the position shown in Fig. 12. The several walls just referred to may be formed from a single section of material of the character already described and scored along predetermined lines in a well known manner to permit the portions of the section to be folded relative to each other into the shape shown to form the walls 14 and 15 and flaps 16. The free edges of the section, when folded, are secured together in any desired manner, whereby the packing means is substantially air tight, when the flaps 16 are folded down and sealed as by gummed tape, as shown in Fig. 12.

17, 17, 18, 18, indicate compartments within the casing wall 14 and adjacent its ends. I preferably place two compartments at each end of the casing in side by side relation. The compartments are of a size to exactly fit between the sides 14. The compartments are constructed to provide two walls adjacent the end wall 15 or flaps 16 and a single wall adjacent the body of frozen material, this arrangement providing three layers of material between the refrigerant and the outside. Each pair of compartments may be formed from a single section of material, of the character already referred to. The section is folded on parallel lines, thus providing a main portion 17a, outer side portions 17b, inner walls 17c, inner side portions 17d and auxiliary insulating walls 17e. The body of frozen material A is disposed between the pairs of compartments and within an inner wall 19 of the packing means 7.

The inner wall 19 may be formed from the same material as that already set forth. The wall 19 surrounds the wrapped body A and is preferably of a length to fit between and engage the compartments 17—17, 18—18, at its opposite ends. In the form of construction shown in Fig. 14 the wall 19 is formed in segments each comprising a curved portion 19a fitting the side of the body A and having along its opposite longitudinal sides radial extensions 19b, 19c, arranged to space the walls 19a from the wall 14. Each extension of each segment abuts the corresponding extension of the adjoining segment, each extension 19b extending into the adjacent corner of the outer wall, whereas each extension 19c is provided with a wing disposed flat against the adjacent wall 14 and engaging at its free end the extension 19b of the segment of which it forms a part.

Figure 14:
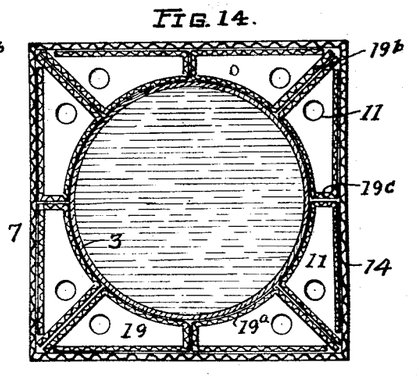
Fig. 14 is a section on the line 14—14 of Fig. 12, enlarged.

It will thus be seen that the walls of each segment co-operate to prevent their distortion and that adjoining segments co-act to maintain the walls 19a in engagement with the body A and the latter centrally of the outer wall 14. Due to the yielding character of the walls of the packing means, the body A will be protected against breakage resulting from normally handling thereof.

The refrigerant, indicated at 20, may be placed in one or more of the compartments 17—17, 18—18, as desired, depending upon the temperature of the atmosphere and time period between packing and unpacking of the body A. I have shown by way of example, the refrigerant in both compartments 18, 18. The refrigerant consists of cakes of what is commonly known as "dry ice". This consists of carbon dioxide gas ($CO_2$) suitably treated in any well known manner to provide it in predetermined size solid cakes, one or more of which are placed in each compartment, as shown. Such gas when prepared in cake or solid form has a temperature of approximately 109 degrees below zero F., but by previously treating the gas by mixture of certain ingredients therewith, the temperature of the admixture in solid form will be approximately 165 degrees below zero F.

Figure 13:
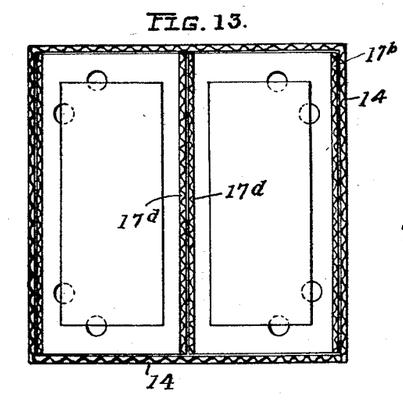
Fig. 13 is a section on the line 13—13 of Fig. 12, enlarged.
Figures 13A, 15, 16:
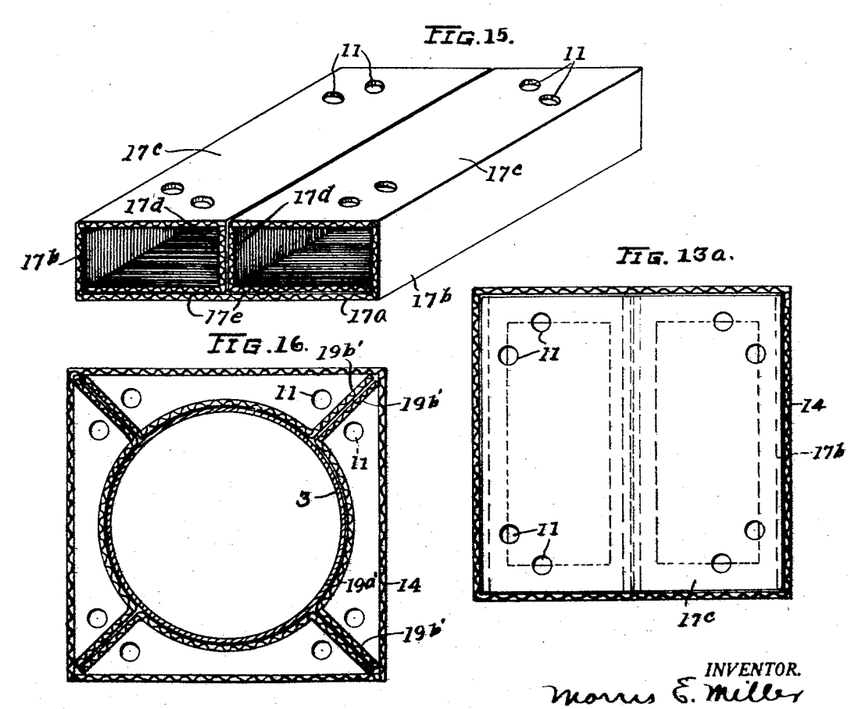
Fig. 13a is a section on the line 13a—13a of Fig. 12, enlarged.
Fig. 15 is a perspective view of a pair of compartments for the refrigerating means.
Figs. 16, 17, 18, 19 and 20 are transverse sectional views similar to Fig. 14, but showing other forms of packing means each embodying my invention.

Fig. 16 shows a slightly different form of packing means wherein a lesser number of segments may be used as compared to the number shown in Fig. 14. In this form of construction each curved wall 19a' extends from one imaginary diagonal to the other and is provided with radial extensions 19b' extending into the adjacent corners of the wall 14.

Figure 17:
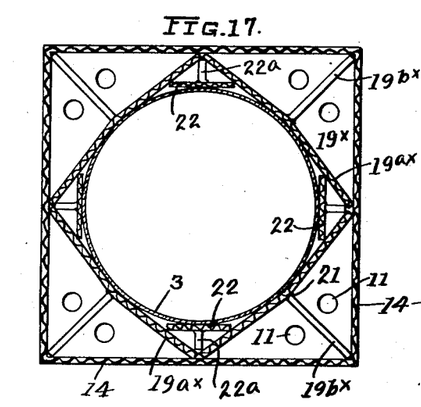
Figures 17A, 17B:
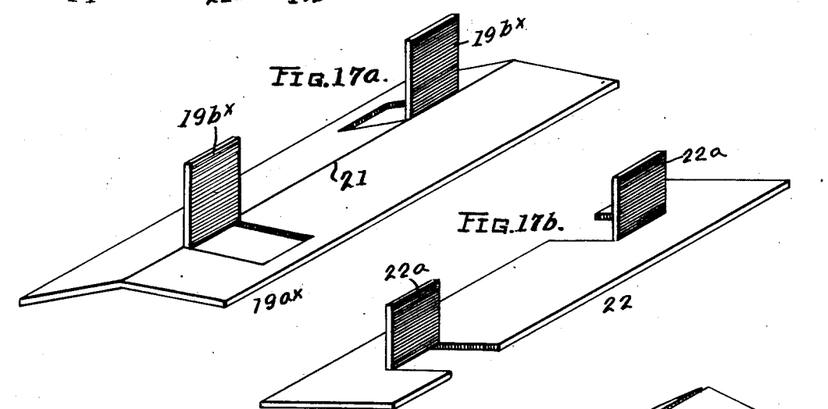
Figs. 17a and 17b are perspective views of spacing elements shown in Fig. 17.

Fig. 17 shows another form of construction in which the inner member 19x, instead of being of cylindrical shape, it is substantially square shape with its corners engaging the sides 14 midway between their opposite side edges. The member may comprise four segments $19a^x$, each having one or more struck-up portions $19b^x$ preferably extending radially from the central portion of the segment into the adjacent corner of the outer member 14, to space and reinforce the segment. By preference, each segment $19a^x$ is bent along its central longitudinal plane as shown at 21 to strengthen the segment longitudinally. 22 indicates supplemental spacers disposed in the corners formed between the adjoining segments $19a^x$, each spacer engaging with and disposed tangentially to the body A and engaging along its opposite longitudinal side edges the adjacent walls $19a^x$. Each spacer 22 may be provided with wings 22a, preferably consisting of struck-up portions, which extend into the corners formed by the segments $19a^x$. The wings 22a serve to strengthen the spacers 22.

Figure 18:
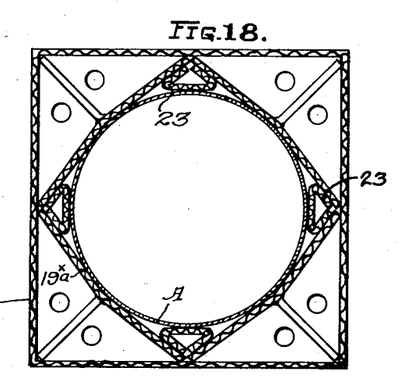
Figure 18A:
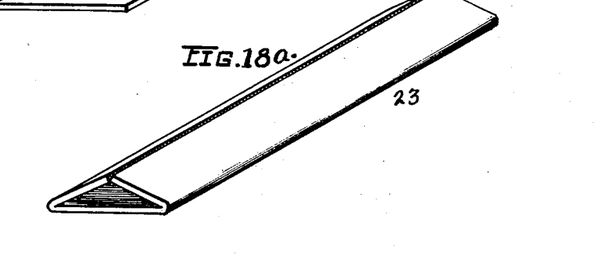
Fig. 18a is a perspective view of a spacing element shown in Fig. 18.

Fig. 18 shows a packing means similar to Fig. 17, except that the supplemental spacers, shown at 23, comprise hollow members, each by preference, of triangular shape in cross section, and of a size so that their sides will engage the body A and adjacent segments $19a^x$.

Figure 19:
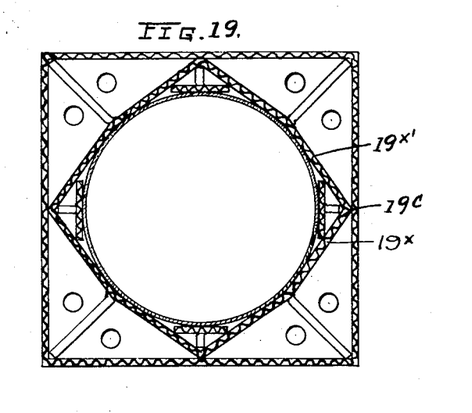
Figure 19A:
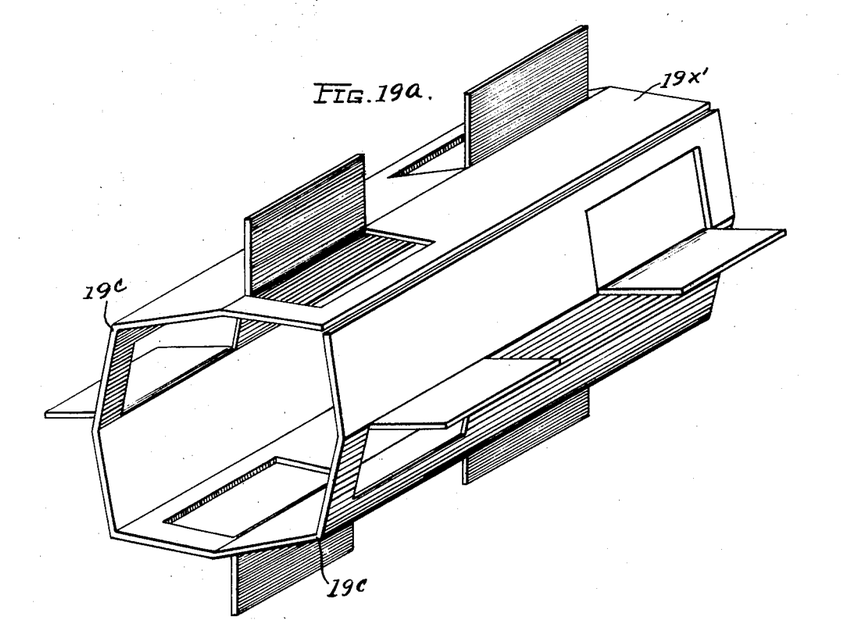
Fig. 19a is a perspective view of a spacing element shown in Fig. 19.

Fig. 19 shows another form of packing means similar to that shown in Fig. 17 except that the segments 19x are formed from a single section of material 19x' bent along longitudinal lines 19c to dispose the portions constituting the walls 19x' in proper relation.

Figure 20:
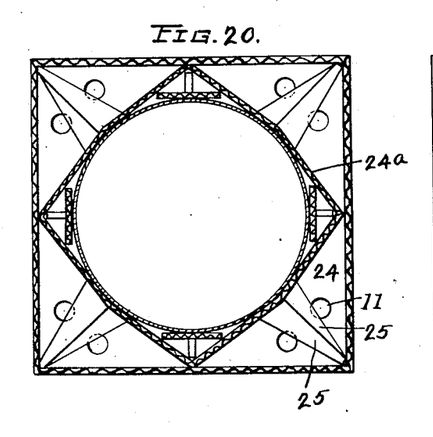
Figure 20A:
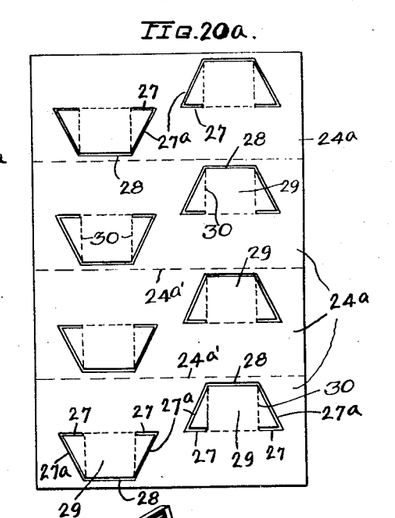
Fig. 20a is a plan view and Fig. 20b is a perspective view of the spacing element shown in Fig. 20; the latter view showing the element folded in operative position.
Figure 20B:
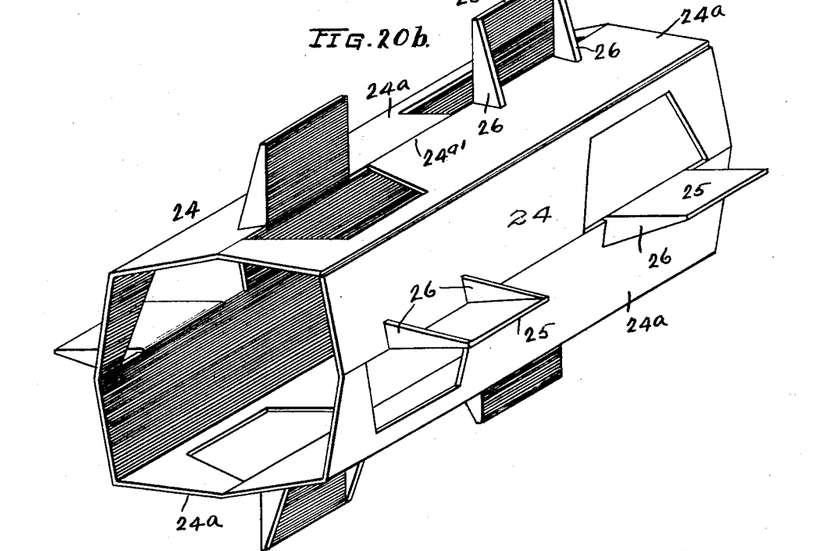

Fig. 20 shows a still further embodiment of packing means embodying my invention, in which the inner member shown at 24 is formed from a single section of material and each of the spacing members 25 for the sides 24a constituting said member is braced along one or both of its side edges by lateral side elements 26. Where each side 24a is provided with two or more spacing members (two being shown on each side 24a in Figs. 20, 20a, 20b), adjoining members are struck-up from portions of the sides disposed on opposite sides of longitudinal lines, as shown, each said side being preferably bent along this line to strengthen it. The inner member 24 is formed from a section of material such as shown in Fig. 20a and scored along the lines 24b to form the sides 24a; the section of material is cut on sets of lines 27, 27, 27a, 27a, 28 to form flaps 29 and each flap is scored on the lines 30, the outer portions of each flap being bent on the lines 30 at right angles, as shown in Fig. 20b, to form wings 26 and the intermediate portion forming the spacing member 25.

It will be understood that in the forms of construction shown in Figs. 16 to 20, a plurality of refrigerant holding compartments are disposed within the outer member and adjacent its end walls and that the inner member engages these compartments at its ends; also that the openings 11 through the inner walls of the compartments are arranged so as not to be closed by the walls of the inner member or its spacing members. It will also be understood that the material of which the outer and inner members and the spacers between them are formed in each of the constructions referred may be similar to the material used in the construction of the walls of the embodiment shown in Figs. 11, 12, 13, 13a, 14 and 15.

In the final step of my process, the packing means 7 is first partially assembled as shown in Fig. 11 and the body A is positioned in the inner member 19 as illustrated, and then the upper compartments 18—18 filled with a refrigerant are placed on top of the body A and inner member 19 and the flaps 16 of the outer member 14 sealed, as shown in Fig. 12, ready for shipment to a distant point.

As will be understood, the completely filled container or packing means 7 is relatively light and the frozen material and refrigerant are enclosed in an insulation which retards the transfer of exterior heat thereto and thus permits of long shipment and retention in the packing means for a long period of time; also that such packing means is relatively cheap and can therefore be retained by the customer and destroyed. Upon receipt of the package for the customer, he opens the same and removes the wrapped body A and inserts it into the refrigerated space of an automatic refrigerating cabinet or a can embedded in ice, or brine. The top of the member 3 is then opened, so that the material may be dispensed in the usual way. The top of the member 3 may be cut off and as the material is dispensed, the upper portion of the member 3 may be cut away so that access is readily had at all times to the material.

To those skilled in the art to which my invention relates many changes in construction and widely differing embodiments and applications of the invention will suggest themselves without departing from the spirit and scope thereof. My disclosures and the description herein are purely illustrative and are not intended to be in any sense limiting.

What I claim is:

1. A closed packing means for a frozen body of food material having walls formed from cellulose material and comprising an outer member, and an inner member comprising sectional side walls disposed edge to edge to form an enclosure for the frozen body and having devices to space said side walls of said outer member.

2. A closed packing means for a frozen body of food material comprising a wrapping of water-proofed paper enclosing the body and an insulating casing formed from cellulose material and comprising an outer member having side and end walls and an inner member having sectional side walls disposed edge to edge to surround the wrapped body and arranged in spaced relation to corresponding walls of said outer member, said sectional walls being separable and removable, compartments for a refrigerant between the end walls of said outer member and the ends of the wrapped body, said compartments being in communication with the space between the side walls of said members, and longitudinally extending spacing devices between the side walls of said members.

3. A packing means for frozen material and formed from cellulose stock and comprising a casing of polygonal shape in cross section provided with end walls, a cylindrical inner member arranged to receive a body of frozen material, portions of said member extending radially into the corners of said casing to support the inner member in spaced relation thereto, and removable compartments between the opposite ends of the frozen body and end walls of the casing and extending across the space between the sides of the casing and inner member, the inner walls of said compartments being formed with openings leading into said space.

4. A closed packing means for a frozen body of food material having walls formed from cellulose material and comprising an outer member, an inner member arranged to receive the body of food material and having its side and end walls in spaced relation to corresponding walls of said outer member, compartments between the end walls of said members and serving as spacers therebetween, the inner walls of said compartments being formed with openings communicating with the space between the side walls of said members, and spacing devices between the side walls of said members extending longitudinally thereof from end to end of said inner member and formed integrally with said inner member.

In testimony whereof, I have hereunto subscribed my name.

MORRIS E. MILLER.